United States Patent [19]
Lally

[11] 3,887,192
[45] June 3, 1975

[54] RANDOM SELECTIVE SWITCHING APPARATUS

[75] Inventor: Joseph Edward Lally, McHenry, Ill.

[73] Assignee: Bally Manufacturing Corporation, Chicago, Ill.

[22] Filed: Dec. 17, 1973

[21] Appl. No.: 425,259

Related U.S. Application Data

[60] Continuation of Ser. No. 321,579, Jan. 8, 1973, abandoned, which is a division of Ser. No. 110,563, Jan. 28, 1971, Pat. No. 3,709,493.

[30] Foreign Application Priority Data

Sept. 29, 1970 United Kingdom............... 46322/70

[52] U.S. Cl............................................. 273/138 A
[51] Int. Cl. ............................................. A63f 9/00
[58] Field of Search ............ 273/86 F, 86 G, 138 A

[56] References Cited
UNITED STATES PATENTS

| | | | |
|---|---|---|---|
| 2,133,165 | 10/1938 | Eisenberg et al.................. | 273/86 F |
| 3,441,277 | 4/1969 | Winn................................ | 273/86 F |

FOREIGN PATENTS OR APPLICATIONS

| | | | |
|---|---|---|---|
| 1,193,947 | 6/1970 | United Kingdom............... | 273/86 F |

Primary Examiner—Anton O. Oechsle
Attorney, Agent, or Firm—Callard Livingston

[57] ABSTRACT

Random or chance operating selective switching apparatus including two switching devices each having a duty cycle in which a plurality of circuit connections are scanned repetitiously and each switching device or means operates to select at least one determinant connection as a function of termination of its duty cycle. The first switching means selects a determinant probability connection and the second a determinant search connection; each such search connection being associated with a particular set of program connections. On initiation of an operating cycle for the apparatus, both switching devices begin their respective duty cycles to scan respective probability and search connections; a selection circuit means terminates the duty cycle of the probability switching device and selects a determinant probability connection associated with some particular set of program connections; the second switching device continues operating until it senses the selected determinant probability connection in some program set and stops, thereby enabling the appertaining set of program connections for utilization purposes.

9 Claims, 5 Drawing Figures

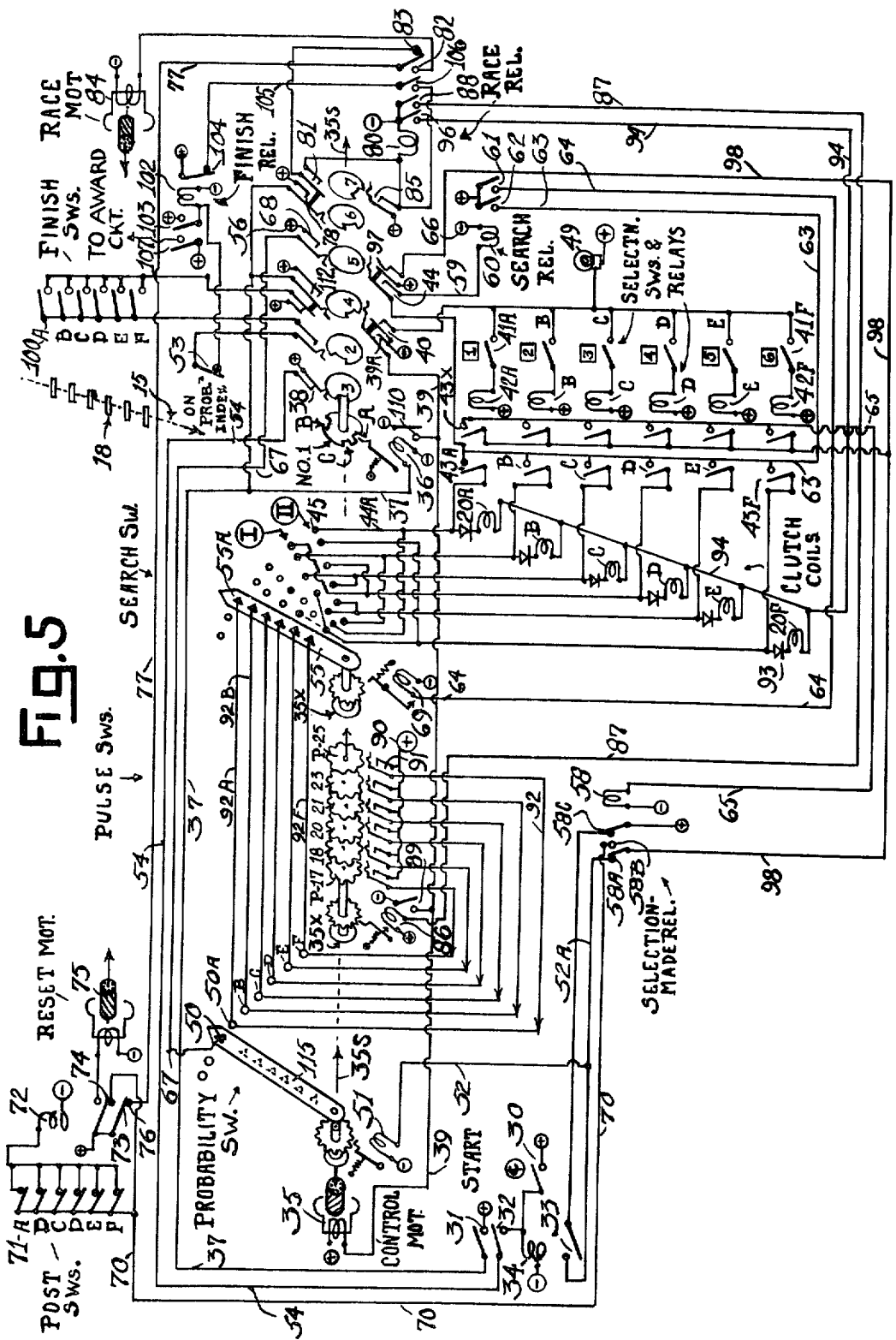

RANDOM SELECTIVE SWITCHING APPARATUS

This application is a continuation of a prior application, Ser. No. 321,579, filed Jan. 8, 1973, and now abandoned, which was a division of a prior application, Ser. No. 110,563, now U.S. Pat. No. 3,709,493, under which prior applications applicant claims priority in Great Britain as of Sept. 29, 1970.

This invention relates to improvements in selective switching apparatus for establishing programmed connections on a random or chance basis for utilization in a variety of applications including coin-released amusement machines, such as the racing game illustrated as one example wherein the movements of a number of racing objects such as simulated horses are programmed by a novel probability and control circuit switching means to "run" in variously changing orders differently programmed for each "race" cycle of operation of the apparatus with provision of pre-selection circuit means permitting the patron to actuate any one of a number of selection switches corresponding to the horse he expects to win.

In such an apparatus, the horses or other programmed devices may each be connected to a corresponding belt or chain drive intermittently coupled by variantly pulsed electromagnetic clutch means to a common motor-driven shaft so that the horses advance at relatively slower and faster rates in accordance with the rapidity of pulses applied or "programmed" by corresponding pulsing switches connected to the several clutch coils actuating the clutches, the most rapidly-pulsed horse arriving at the finish position to actuate a "Finish" switch to win and terminate the race and operating cycle.

In accordance with one of the principal features of the invention the amusement apparatus is characterized by the provision of a novel race programming and control circuit including a power-driven probability switch means having a progressively travelling contactor caused to stop responsive to the operation of a patron's selection switch means to set up an imcomplete search circuit through a companion power-driven search switch means likewise having a progressively-travelling contactor which will complete such search circuit in conjunction with the operated selection switch means and thereby connect the several pulsing switches to the clutch coils in accordance with predetermined different Program-circuit arrangements disposed in sets or groups at different angular positions in the stationary contact fields of the probability and search switch means, thus affording (in a change or practically unpredictable manner controlled by the respective positions at which the travelling switch contactors are caused to stop in any race cycle) a variety of changes in program with, nevertheless, some participating control by the patron.

Further features characterizing the invention relate to the prevision of coin-controlled starting switch means operative to initiate a race cycle in cooperation with the novel programming and control switch means, together with the provision, where desired, of award means including award circuitry cooperative with the probability and selection means to control a prize or score register in cases where the selection matches the winning condition determined by the probability switch.

One embodiment of the invention illustrative of the foregoing features and a preferred but not otherwise limiting mode of operation, is depicted in the annexed drawings in which:

FIG. 5 depicts a more detailed form of circuit means for effecting operation such as described in view of FIG. 3.

Figure 1:
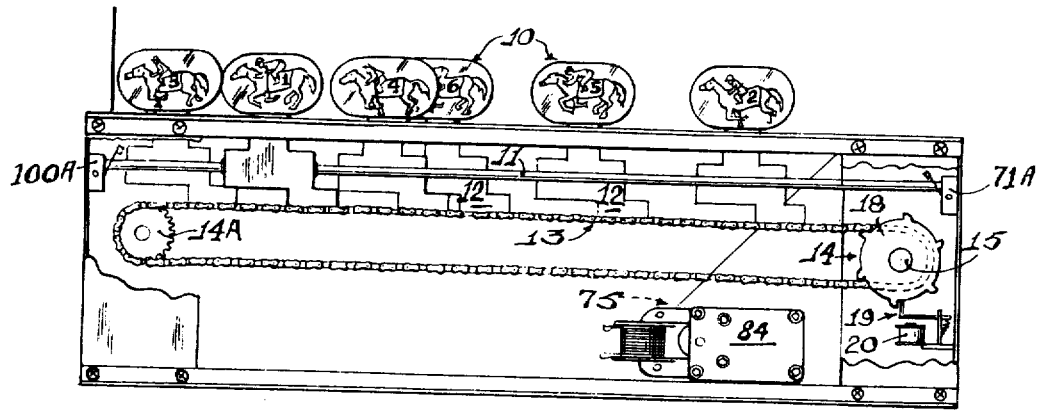
FIG. 1 is a side elevation of the chasis mounting the racing objects, driving motors, clutch means and the "post" and Finish switches.
Figure 2:
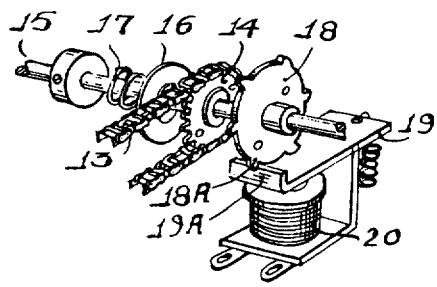
FIG. 2 is an enlarged, partially exploded perspective detail of one of the horse drive clutch coil assemblies.

As seen in FIG. 1, the racing objects are in simulation of horses (designated by one of the numerals 1 to 6) depicted on transparent plastic carriers 10 slideably supported on corresponding rods 11 with depending parts 12 respectively attaching to a corresponding drive belt or chain 13 trained over sprockets 14 and 14A, one of the former being seen to enlarged scale in FIG. 2. The sprockets 14 each constitute a part of a slip-clutch means and float freely on a common motor-driven cross shaft 15 adapted to be driven in opposite directions by meter means preferably comprising two motors, instead of the circuitry required for reversing one.

A Reset Motor 75 (FIG. 3 only) is employed to return the horses to the Post position; it is identical to, and situated in the view of FIG. 1, behind a Race Motor 84 adapted to drive the horses at variable rates through electrically-controlled clutch means (FIGS. 1 and 2) pulsed at relatively different rates during each race cycle under control of the novel programming and control circuit means to be described.

As seen in FIG. 2, each clutch includes a driving disc 16 fast on the motor shaft 15 and urged by spring means 17 to press drivingly against the side of the corresponding sprocket 14 which is affixed to or part of the control disc 18 provided with stop teeth 18A engageable by the endwise pawl portion 19A of the armature 19 of a corresponding clutch control electromagnet or coil 20 energizable to withdraw the armature and free the corresponding disc 18 and its driving sprocket 14 for rotation by appertaining disc 16 on the common shaft, whereby to advance the appertaining horse drive chain 13.

In the form of the apparatus shown, there will preferably be six racing objects or horses, and therefore six of the drive chains 13 and a corresponding number of control clutches, all comprising part of the chassis subassembly shown in FIG. 1, which further includes a set of six Finish switches 100A . . . to 100F, each in alignment with the horse carriage structure of a corresponding one of the horses at the far end of the flight of the chains, there being a set of six Post switches 71A . . . to 71F similarly aligned at the opposite or Post end of these chains, these switches being respectively connected for operation such that when all horses are returned and have therefore closed all of the Post switches, the resetting operation is completed and the race will be started after a "line-up", the first horse to actuate onf of the six Finish switches causing the race drive motor to be stopped and otherwise terminating the cycle.

Figure 4:
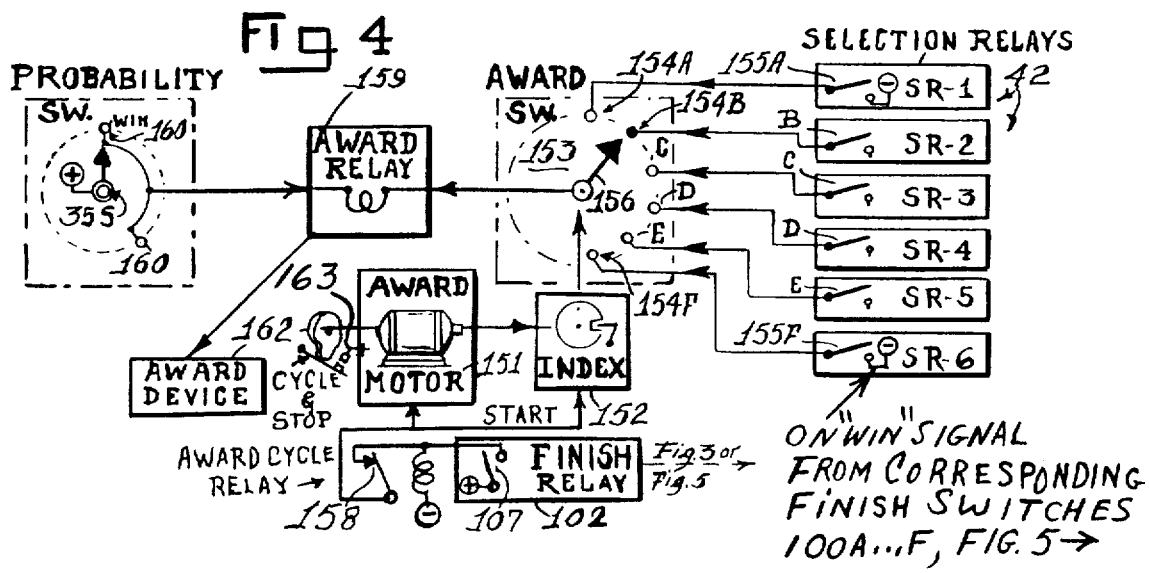
FIG. 4 is a schematic circuit and block diagram illustrating and award circuit.
Figure 3:
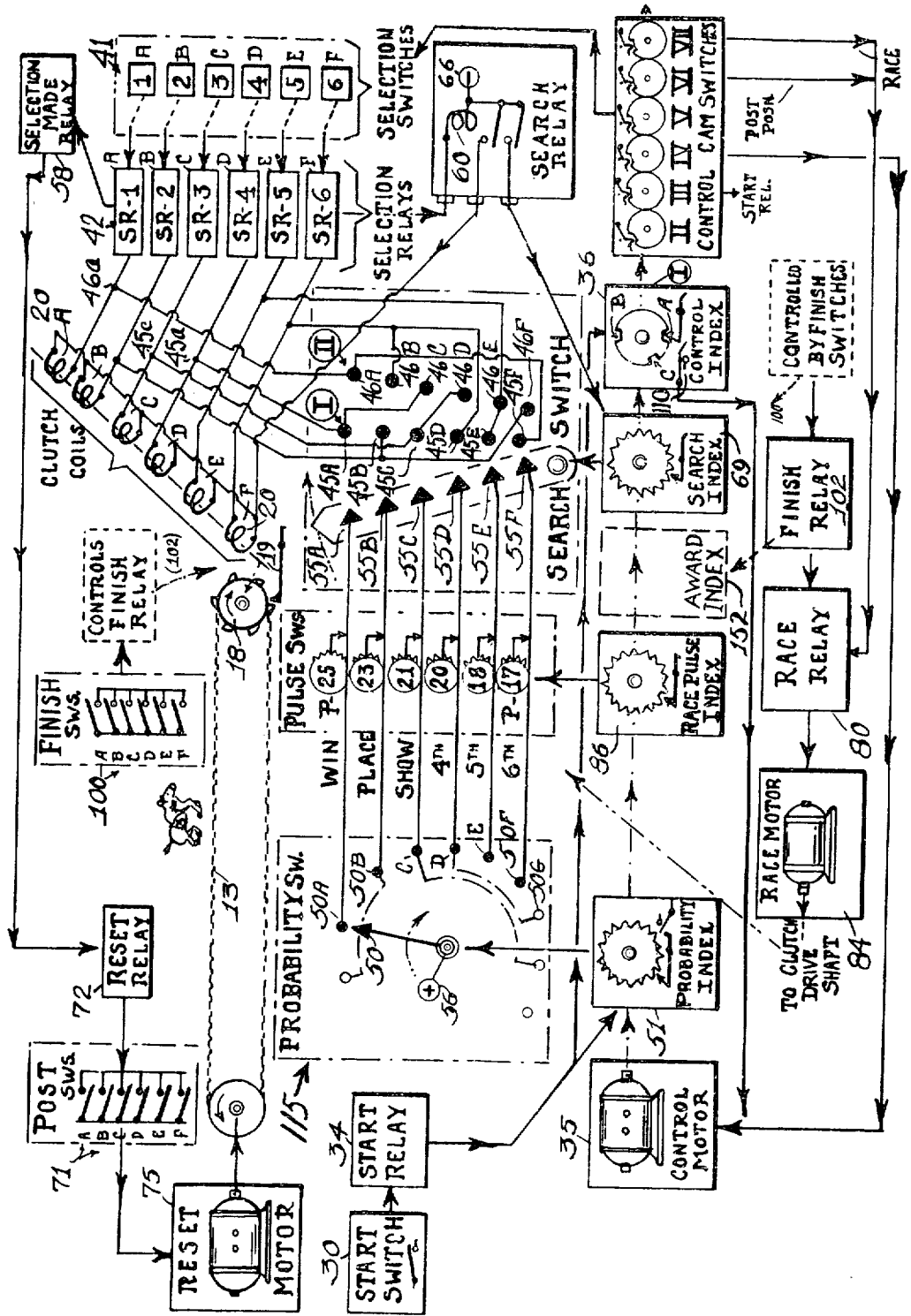
FIG. 3 is a schematic circuit and block diagram illustrative of the functional relationship of certain circuit components and subcircuits utilizing the novel programming and control means.

The race programming and control apparatus illustrated in FIGS. 3, 4 and 5 may preferably be embodied in one or more additional subassemblies (not depicted as such) interconnecting with each other and with the subassembly of FIG. 1 by the usual plug-in cable means, the entire apparatus usually being in such cases housed in a suitable cabinet (not shown) and preferably adapted for coin-released operation.

Referring to FIG. 3, the operation of the apparatus in the running of a race begins with the initiation of the "race cycle" by actuation of a starting switch means 30 (which may be coin-released or operated) to energize a Start Relay 34 thereby actuating the Probability Index Means 51 so that the Probability Switch Contactor 50 forming part of the probability switch means which is indicated generally by the reference numeral 115 will be in readiness to start immediately with starting of the Control Motor 35. At the same time, this Start Relay also pulses the Control Index Means 36 causing closure of an Index Switch 110 to start said Control Motor 35, thereby initiating the first phase of rotation of the set of seven Control Cam Switches designated by Roman numerals I to VII, in which operation Cam I will move from indexing notch A to notch B.

Shortly after the Control Motor 35 starts, switch contacts controlled by Cam III will drop out the Start Relay, and other circuits controlled by Cam Switch IV will hold the motor circuit and also condition the Selection Switches for operation.

Cam switch V connects enabling power at this time to the Selection Switches and Selection Relays and also to the travelling contactor or wiper 50 of the Probability Switch and the Index means 51 for the latter whereby said contactor is kept scranning over the field of stationary probability contacts until such time as the patron makes a selection and abruptly stops this scanning operation by pressing one of the Selection Switch buttons 41.

The Control Index means 36 is energized for a second phase of control operation by Cam Switch IV, so that the Indexing Cam I progresses from the position corresponding to indexing notch B to notch C, and during this interval the patron makes his selection of a horse expected to win by operating one of the Selection Switches 41 as aforesaid (these switches being of the known mutually excluding lockout type, either electrical or mechanical, so that no more than one can be operated at a time) which in turn will result in operation of the corresponding Selectrion Relay 42, thereby setting up an "incomplete search circuit" to a particular one of the stationary determinant search contacts in the field of program search contacts of the Search Switch means. The moment such a selection is made, the Probability Switch means owing to the operation of a Selection-Made Relay 58, which actuates the Probability Index means for this purpose, and thereby causes the Probability Contactor 50 to stop on whatever program contact it happens to be approaching at the moment, as illustrated, for example, on the Probability Contact 50A in the field of stationary programming contacts of the Probability Switch, this being a further step toward the completion of the Search Circuit.

Let it be assumed now in the present example that the patron has chosen to operate the No. 1 Selection Switch 41A thus actuating the corresponding Selection Relay SR-1 (42A) to establish the first or "selection-made" part of the incomplete search circuit extending from connection from power source 66 through the coil of the Search Relay 60, contacts on the Selection Relay SR-1 which has been actuated as aforesaid, and the connection at 46a to the corresponding contacts 46A and 45F appearing in both of the search groups I and II in this view.

Since power from the terminal 56 is connected to the Probability Contactor 50 at this time and this contactor has been brought to rest upon Probability Contact 50A, it will be evident that Search Contactor 55A upon "finding" or advancing into engagement with the "hot" Search Contact 46A will thereby complete an energizing search circuit for coil 60 of the Search Relay and actuate the latter and instantly stop the Search Switch in this "search-completed" condition, this being effected by closure of contacts on the Search Relay and other contacts closed by the operation of the Selection-Mode Relay which will have been pulled-in responsive to the making of the selection as detailed hereafter.

Another consequence of the aforesaid operation of the Selection-Made Relay is the operation of the Reset Relay 72 to start the Reset Motor 75 and thereby effect return of the horses to the Post position — toward the right in FIG. 1, and the left in FIG. 3. When all six of the Post switches 71A . . . 71F have been operated by return of the corresponding horse figures, the operating circuit for the Reset Relay is interrupted and the Reset Motor stopped.

When the Reset Relay drops back as a result of return of the horses to the Post position as aforesaid, normal contacts thereon will enable a circuit controlled by Control Cam Switch VI to energize the Race Relay 80 and thereby momentarily pulse the Race Motor 84 for the purpose of jogging the six horses up a very short distance to an imaginary "starting line", this being effected by permitting each horse carrier to be advanced slightly by the Race Motor until a tooth on the appertaining clutch sprocket 18 abuts the pawl and 19A of the corresponding clutch control armature, the several clutch discs slipping momentarily as necessary until all of the horses line up against their pawls in this manner, such a line-up being desirable because of operating tolerances in the chain drive and switch levers which permit the several horses some latitude of movement in engaging and actuating their respective Post Switches, which, but for such line-up, would usually leave the horses in an uneven alignment for the start of the race.

The aforesaid "line-up" jogging requires only about 1 second and is followed without marked paused by another operation of the Race Relay, but this time initiated by Cam Switch VII to start the Race Motor running for the duration of the race under joint control of the Race and Finish Relays; and in addition, the Race Pulse Index Means 86 is operated at this time to effect rotation of the set of pulsing switches P25, 23, 21, 20, 18, P17, now connected through the programming operation to pulse the several horse clutch coils 20A . . . 20F in accordance with the particular race pattern determined by the operation of the Probability and Search Switch means earlier in the cycle, as will be more fully explained hereafter in view of FIG. 5.

The first horse to arrive at and actuate its corresponding Finish Switch 100A . . . 100F will cause energization of the Finish Relay 102 which will break the holding circuit for the Race Relay and stop the Race Motor, thus terminating the race and the race cycle. It may be observed that in the interval just prior to the actual start of the race by Cam Switch VII the Control Index Means is actuated for the brief third and last control phase, which corresponds to the movement of Cam I from the C position back to the starting or A Index position in readiness for the next cycle.

The variations in racing movement of the horses from one cycle to the next are programmed by the Probability and Search Switch means in accordance with the following explanation, confined to two examples in order to avoid obscuring the cross-connections in the wiring diagram for the search contact field in the limited space of FIGS. 3 and 5.

The six horse clutch coils 20A ... 20F are variously cross-connected into the several individual sets of search contacts comprising six radially-arranged search contacts in each set, and respectively constituting one of the search groups designated (I) and (XX), it being understood that in practice there will be many more such groups, possibly 50, in a single field of search contacts.

If it is now assumed that the patron has made a selection and that the Probability Contactor 50 has stopped on Probability Contact 50A, it will be observed that this contact is connected to be pulsed by the Pulse Switch means P-25 having the fastest or winning rate of 25 pulses per revolution of the pulsing cam, it being observed further that this winning pulse switch is also connected to Search Switch Wiper or Contactor 55A.

It is assumed further that the patron has chosen the No. 1 horse to win by actuating the corresponding Selection Switch 41A and therfore the corresponding Selection Relay 42A (also designated SR-1) which is connected to the Clutch Coil 20A for the No. 1 horse. Following the unpredictable stoppage of the Probability Switch, as the result of making this selection, the Search Switch Wiper or Contactor 55A will be in circuit and enabled for the purposes of completing the search circuit, and when the search contactor reaches or finds search contact 46A in Group II, now hot, the Search Switch will stop in completion of the search circuit to actuate the Search Relay 60 as previously explained, and accordingly it will be evident that the selected No. 1 horse does in fact win in this race, the 25-pulse rate switch being connected to clutch coil 20A from Search Contact 46A at junction 46a.

Thus, the order of advance of the horses for this particular race program would be: horse No. 1/Win; No. 2/6th; No. 3/4th; No. 4/Show; No.5/5th; No. 6/Place.

For a second example, let it be supposed that the patron this time selects the No. 4 horse to win; accordingly, the search circuit will be extended from junction 45a to search contacts 45A in Group I, and because the Probability Switch Wiper is again assumed to have been stopped on Probability Contact 50A, the Search Wiper 55A on reaching or finding the contact 45A in Group II will cause the Search Relay to pull-in, thus stopping the Search Switch and thereby determining a different program as follows: horse No. 1/6th; No. 2/Show; No. 3/Place; No. 4/Win; No. 5/5th; No. 6/4th.

Each horse (clutch coil 20) appears once in each radial set or Group I or II of Program Search Contacts, but usually in positionally scrambled or shifted relationship with respect to its position in any other set or Search Group. Each of the six searching wiper contacts connects one of the six Pulse Switches to some clutch coil in each programming position. Thus, since the clutch-coil search contacts appear in different relative positions in each radial or angular set or search Group, the pulsing of the six coils will be changed in each search-completed position. It is to be understood that the contacts such as 50A ... 50F depicted in the Probability Contact field in FIGS. 3, 4 and 5 will be much more numerous in the contact banks of the actual apparatus, and the distribution and maximum number of appearances of the Win, Place and Show contacts will be limited in the frequency or "Probability" that they will be selected in any cycle, so that while each race will always have a winner and the rest of the positional values — Place, Show, etc., the selection feature will not be able to select the winner with more than a mathematically-determined probable frequency calculated to prevent predictability.

While the Probability Contactor 50 in the simplified illustration determines only the winner of each race, and the Selection Switches are not arranged to select other than a winner, i.e. place or show positions, it is to be understood that an expansion of the principles explained can achieve such additional selections in the actual apparatus wherein the number of Probability and Search Contacts and the programming connections therefore are considerably more numerous than the limited space of the present drawings permits to be shown.

An award circuit, such for example as that depicted in FIG. 4, may be used optionally with the arrangement of FIGS. 3 or 5 and is adapted to be controlled by the Finish Relay 102, which is pulled in on closure of any one of the Finish Switches and will close its contacts 107, thus energizing an Award Cycle Relay to apply a momentary starting pulse to the Award Motor 151 and its Index means 152. This motor will then run through one control cycle and be stopped under control of its cycling switch 163, the original starting circuit being broken at contacts 158 of the starting relay which holds in because in the preferred arrangement, as previously explained, the Finish Relay preferably holds in from one coin-released game cycle to the next and its contacts 107 will therefore remain closed until the game is recycled.

The rotary contacts 156 of the Award Switch in each award cycle initiated will scan Award contacts 154A ... 154F provided for Award purposes on the Selection Relays to find any that have been closed by actuation of a Selection Relay during the race cycle, and upon engaging such contacts, e.g. 154B, will complete a power circuit for an Award Relay 159 through any Win contact 160 (connecting with or corresponding for instance to contact 50A in FIG. 3) which at this time stands enabled or hot as the result of the operation of the Probability Switch Wiper Means stopping thereon during such race cycle, in consequence of which the Award Relay will thereupon be operated to actuate any desired Register or Award Means 162.

Detailed circuit means and connections are shown in FIG. 5 for the type of coin-controlled machine described more generally in view of FIG. 3.

Operation of the starting or coin-controlled switch 30 energizes the Coin Relay 34 which holds in at its contacts 32 from power on conductor 54 and contacts 38 on Cam Switch No. 3, while Coin Relay contacts 33 pulse the Probability Index Coil 51, via conductor 52 from power at normal contacts 58C on the Selection-Made Relay, to condition the Probability Contactor 50 of Switch Means 115 115 to start its travel the instant the Control Motor starts on closure of Coin Relay Contacts 31 and the consequent energization via conductor 37 of the Index Coil 36 for the No. 1 Control Cam which thereupon indexes this unit for rotation in the A To B phase of its cycle and also closes Index Contacts 110 connecting power to Motor Conductor 39 feeding the Control Motor.

Cam No. 3 now opens switch 38 to drop out the Coin Relay, and may also control such other resetting operations as are desired in various forms of the machine, such for example, as resetting any score or other award devices, as well as a momentary opening and reclosing of a known form of master power switch (not shown) of the type commonly employed for fraud-prevention purposes in such coin-controlled machines.

Preferably power will be held on Probability Index Coil 51 by normal contacts 58C on the Selection-Made Relay shunting the Coin Relay Contacts 33 against any off-timing in closure of Cam Switch No. 5 Contacts 97 while the Coin Relay is dropping out.

Cam Switch No. 4 at contacts 112 applies a second releasing pulse to indexing conductor 37 and the control Index coil 36 for continuation into the B to C phase of its cycle during which the Selection feature may be exercised, and this results in keeping Cam Index Switch 110 closed to maintain holding power on Motor Conductor 39 so that Control Motor 35 will continue to run through this B to C phase and finally back to the A or starting position to conclude its operating cycle.

Cam Switch No. 5 in this B-to-C phase closes contacts 97 applying power via conductor 98 and normal contacts 58A on the Selection-Made Relay, conductors 52A and 52, to hold the Probability Index Means 51 energized so that the Probability Contactor continues its travel over the field of determinant Probability Contacts 50A . . . 50F until the selection is made.

Cam Switch No. 5 also closes contacts 68 to apply enabling power via conductor 67 to the Probability Contact 50, and will in addition connect the Search Relay Coil 60 via Cam Switch Contacts 44 to enable all of the Selection contacts 43A . . . 43F of the Selection Relays in readiness for the selecting operation.

Assuming Selection Switch 41A to be duly actuated, the corresponding Selection Relay 42A pulls in closing its contacts 43A to enable via conductor 44A some one (45) of the complementary determinant search contacts 45A . . . 45F or 46A . . . 46F in search groups I and II, as previously explained in detail in view of FIG. 3, while contacts 43X, on this relay or any of the other Selection Relays respectively, will close to energize the Selection-Made Relay Coil 58 via conductor 65 thus opening the Probability-Stopping Normal Contacts 58C to drop out the Probability Index Coil 51 and initiates stopping the Probability Contactor 115 with its contact 50 in engagement with some determinent probability contact such as 50A, connecting via conductor 92A, with some search contact such as 55A on the Search Contactor 55, so that when the advancing Search contact 55A encounters the hot complementary determinant search contact 45 enabled by the aforesaid selecting operation, the Search Relay Coil 60 will be pulsed with consequent closure of its contacts 61 to energize, via conductor 64, the Index Coil 69 for the Search Contactor, thereby stopping the latter abruptly in said Group II set of search contacts containing (in the illustration of FIG. 5) the determinant contact 45.

When the Selection-Made Relay pulls in as aforesaid, resetting of the horses occurs as the result of closure of contacts 58B thereon applying power via conductor 70 and the set of six normally closed Post Switches 71 to energize the coil 72 of the Reset Relay with resultant closure of contacts 74 thereof to start the Reset Motor 75 and rapidly return the horses until all six of the Post Switches 71A . . . 71F are opened, whereby to drop out the Reset Relay and stop the Reset Motor.

Prior to dropping the Reset Relay, as aforesaid, its normal contacts 73-76 stand open so that the Race Relay is inoperable; but when the Reset Relay is dropped on Post return, these contacts 73-76 reclose to restore power via conductor 77, normal contacts 83 on the Race Relay, and contacts 81 on Cam Switch No. 6, which is timed to close its contacts 81 at this juncture and effect the first, and only momentary, jogging operation of the Race Relay by pulsing coil 80 of the latter for line-up of the horse at starting as previously explained in detail in view of FIG. 2.

The aforesaid operation of Cam Switch No. 6 also closes Contacts 78 to pulse the Control Cam Index Means 36 for a last time for completion of the terminal phase of the cam rotation from the C back to the A or starting position during which Cam Switch No. 7 closes its contacts 85 to energize the Race Relay for the second and last time and thereby start the running of the race by energizing, through contacts 82, the Race Motor 84 while setting up its own holding circuit at contacts 106, now enabled due to the previously-mentioned dropping out of the Reset Relay.

The set of six Pulsing Switches P-17 . . . P-25 now stand connected to the set of six horse clutch coils 20A . . . 20F in accordance with the particular program arrangement of connections which are thus completed through the selected set or group of program search contacts 45A . . . 45F, 46A . . . 46F, etc., to be pulsed at relative rates in the detailed manner previously explained in view of FIG. 3, such pulsing resulting from freeing the appertaining pulsing came as the result of energization of the Pulse Index Coil 86 via conductor 87 and the now-closed contacts 88 on the Race Relay. The diodes 93 prevent disturbance from spurious feedback currents and transients.

Control Motor 35 is maintained in operation notwithstanding return of Control Cam No. 1 to the A position as aforesaid (following operation of Cam Switch No. 7) owing to closure of Index Switch 89 on the Pulse Index Means which now serves to hold power on motor conductor 39 for the remainder of the race cycle.

The described race cycle is terminated when the horse advanced at the 25-pulse rate reaches and closes the appertaining one of the Finish Switches 100A . . . 100F, thereby energizing the coil 102 of the Finish Relay to interrupt the holding power for the Race Relay at contacts 106 of the latter, the Finish Relay remaining thus operated by holding power at its own contacts 103.

The Race Motor 84 stops upon reopening of Race Relay Contacts 82 when this relay drops out, and the Control Motor stops owning to reopening of Race Relay Contacts 88 which drop out the Pulse Index Coil 86 and thereby cause the motor holding switch 89 thereof to reopen.

In the coin-controlled embodiments of the apparatus, it is preferred to permit the Finish Relay to remain in operated condition, as last described, until such time as another race cycle is initiated, this relay being ultimately dropped out as an incident to momentary interruption of the master power supply to the machine by a known type "anti-cheat" protective switch (not illustrated) responsive to pulling in of the Coin Relay.

While the programming means is illustrated as utilizing the Probability and Search switches in combination with a Selection Switch means operative to set up different operating programs in a random manner for controlled devices, such as the racing objects or horses of an amusement apparatus for advance thereof by actuating means in the form of the Pulsing Switches, the utility of the novel programming means is evidently useful in other applications, and the detailed description of specific circuit means and connections is intended to be illustrative rather than limiting upon the invention defined in the appended claims.

I claim:

1. Program control apparatus comprising: a master control circuit including duty-cycle initiating switch means; at least two rotary type switches respectively designated as the probability switch and the search switch and cooperative in related duty cycles to select and establish program connections, the probability switch including a rotary probability contactor and probability contacts engageable thereby in various stopping positions thereof in each duty cycle with consequent enablement of such a contact as a determinant probability contact effective in completing a search circuit cooperably with a determinant search contact enabled by the search switch in a related duty cycle; said search switch having a rotary search contactor and a field of program contacts arranged in sets which are respectively engageable thereby in various stopping positions in each duty cycle thereof; drive means actuated under control of said cycle-initiating switch means operative to initiate a duty cycle setting said contactors in motion; selection switch means operative to selectively connect some contact appertaining to some one of said sets of program contacts for enablement in said search circuit as a determinant search contact effective on interconnection with an enabled determinant probability contact to complete such search circuit; first circuit means operative responsive to selecting actuation of said selection switch means to cause discontinuance of drive of the probability contactor by said drive means and thereby cause stoppage with a coming to rest of said probability contactor in some one of the said stopping positions thereof as a random occurrence effecting enablement of a determinant probability contact as aforesaid; and second circuit means operative responsive to completion of the search circuit as aforesaid to cause the stoppage of the search contactor in program-connecting engagement with that one of said sets of program contacts to which such enabled determinant search contact is appurtenant.

2. Apparatus according to claim 1 wherein said program contacts and determinant search contacts lie substantially in the same plane and such plane is at substantially right angles to the axis of rotation of the search contactor; and each determinant search contact enabled as aforesaid is thereby angularly related to the appurtenant set of program contacts in such manner that stoppage of the search contactor in engagement with a determinant search contact finds the search contactor stopped in an angular position in program-connecting engagement with the appertaining set of program contacts to effect program connections therewith as aforesaid.

3. Apparatus according to claim 1 wherein said drive means includes an electric motor rotating a drive shaft common to said contactors and the latter are individually drivingly coupled and uncoupled with said shaft by electrically-controlled index means independently operative to initiate the respective duty cycles for said contactors and to discontinue such duty cycles to effect stoppage of the contactors as aforesaid.

4. Apparatus according to claim 1 wherein said search circuit includes a search relay actuated in dependance upon completion of the search circuit as aforesaid, and said search relay controls, at least, the stoppage of the duty cycle of the search contactor as aforesaid.

5. Apparatus according to claim 1 wherein said selection switch means includes a plurality of selection switches and relay means including a selection-made relay operated responsive to actuation of any of the same; and said selection-made relay controls the stoppage of the duty cycle of the probability contactor as aforesaid.

6. Program selection apparatus including a chance operating factor and comprising at least two start-stop type rotary switches one of which is designated a probability switch and has probability contacts engageable by a rotary probability contactor in various stopping positions thereof, and the other of which is designated a search switch and has a rotary search contactor and a plurality of sets of program contacts engageable thereby in various stopping positions thereof; said switches being cooperable in selection duty cycles to effect operational program connections for one or another of said sets of program contacts; a master control circuit including drive means actuated thereby and operative to initiate a said duty cycle and set said contactors in motion; selection switch means operative selectively to establish a search circuit enabling some contact in one or another of said sets of program contacts as a determinant search contact; first circuit means operative responsive to actuation of said selection switch means to effect a stopping of the probability contactor in engagement with some probability contact and enable the search contactor to connect the same with any enabled determinant search contact it encounters; and second circuit means operative responsive to interconnection of an enabled probability contact and an enabled determinant search contact to effect stoppage of the search contactor in program-connecting engagement with the particular set of program contacts containing the determinant search contact which effects such stoppage.

7. In a random type selection circuit, in combination:
  a. first and second rotary switches each having multiple stationary contacts and corresponding first and second rotary contactor means respectively engageable therewith in various stopping positions thereof;
  b. control circuit means including drive means operative to set said contactor means in motion;
  c. the stationary contacts of the first switch in at least some of said stopping positions of the first rotary contactor means being enabled as determinant probability contacts as a function of stopping of said first contactor means;

d. the stationary contacts of the second rotary switch being arranged in predetermined sets each corresponding to one of the stopping positions of the second rotary contactor means and effective when engaged as a function of stopping of such contactor means to establish operational program connections conforming to the particular program arrangement of the engaged set;

e. interconnecting circuit means connecting at least some of said probability contacts with contact elements comprising part of said second contactor means and respectively engageable with contacts in each set in the various stopping positions of said second contactor means;

f. selection circuit means operative to effect disconnection of driving power of said drive means from said first rotary contactor means in a manner such that the latter will come to rest in some one of said stopping positions to enable some one of said probability contacts;

g. first circuit means operative dependently upon operation of the selection circuit means as aforesaid to enable a contact present in any program set as a determinant contact for such set;

h. second circuit means operative to stop the second rotary contactor means at any of the stopping positions thereof to establish operational connections as aforesaid for the program contacts of any such set provided it contains an enabled determinant contact which is also interconnected with an enabled probability contact.

8. Random selection switching apparatus including probability switch means and search switch means cooperative in related duty cycles with selection switch means rendered operative during each said cycle to set up and complete search circuits respectively establishing operational circuit connections for at least one of a plurality of sets of program connections for programmed operation of controlled devices; said selection switch means including selection switches respectively operative to establish a search circuit with enablement of a determinant search connection which is appurtenant to some particular set of program connections; said probability switch means being operative in its duty cycle to enable some one amongst a plurality of probability connections; said search switch means being operative in the related duty cycle to scan all of said probability connections electrically and connect with an enabled probability connection in completion of said search circuit; master control circuit means including starting switch means operative to initiate the related duty cycles of said probability and search switch means; first circuit means responsive to actuation of any said selection switch to terminate the duty cycle of the probability switch means with resultant enablement of some probability connection as aforesaid; second circuit means operative responsive to completion of the search circuit as aforesaid to effect termination of the duty cycle of the search switch means and effect through the latter operational connections as aforesaid for the particular set of program connections to which the said determinant search connection is appurtenant.

9. In random selective switching apparatus of the type having an operating cycle for making random or chance selection of one or more sets of predetermined circuit connections which are arbitrarily designated as program connections, improvements comprising, namely: first switching means designated the probability switching means having a duty cycle and a plurality of probability connections at least one of which is selected as a determinant probability connection as a function of termination of such duty cycle; second switching means designated the search switching means likewise having a duty cycle together with a plurality of sets of program connections at least one of which is selectable thereby as a function of termination of its duty cycle, each of said sets including at least one connection designated as a determinant search connection and each of the same being connected with at least one of said determinant probability connections of the probability switching means; starting circuit means operative to initiate an operating cycle of said apparatus and effect starting at substantially the same time of the respective duty cycles of said probability and search switching means; selection circuit means operative to terminate the duty cycle of said probability switching means and thereby cause selection in a random manner of at least one probability connection; circuit means automatically operative to terminate the duty cycle of the search switching means and selectively connect for utilization purposes at least one set of program connections responsive to detection in such set of a determinant search connection therein which is connected with a determinant probability connection selected as aforesaid.

* * * * *